United States Patent [19]

Spooner

[11] 4,340,274
[45] Jul. 20, 1982

[54] VISUAL DISPLAY APPARATUS

[75] Inventor: Archer M. Spooner, Orlando, Fla.

[73] Assignee: Redifon Simulation Limited, Sussex, England

[21] Appl. No.: 111,281

[22] Filed: Jan. 11, 1980

[30] Foreign Application Priority Data

Jan. 11, 1979 [GB] United Kingdom ................. 7901012

[51] Int. Cl.³ ............................................ G03B 21/60
[52] U.S. Cl. ................................................. 350/128
[58] Field of Search .............................. 350/127–129, 350/288, 322

[56] References Cited

U.S. PATENT DOCUMENTS

| | | | |
|---|---|---|---|
| 1,983,626 | 12/1934 | Lytle | 350/127 |
| 2,313,947 | 3/1943 | Klinkum | 350/127 |
| 3,811,750 | 5/1974 | Coulthard | 350/129 X |
| 3,844,644 | 10/1974 | Martinez | 350/129 X |

Primary Examiner—Richard A. Wintercorn
Attorney, Agent, or Firm—Larson and Taylor

[57] ABSTRACT

The invention provides head-coupled area-of-interest visual display apparatus particularly for ground-based craft-flight simulators. The apparatus provides binocular vision of a display projected onto the inside of a part-spherical shell which surrounds the pilot and carries a concave retro-reflective screen. The display covers an area of interest determined by craft position and attitude and the viewer's instantaneous line of view. The image or images are projected from points horizontally in line but vertically displaced above the viewer's eye positions. If the retro-reflective screen material has a very small angle cone of reflection, light is reflected back to the projection point rather than to the viewer's eyes. The invention provides a screen reflection characteristic modified in all vertical planes by the use of an optical grating in combination with a highly retro-reflective screen material.

5 Claims, 3 Drawing Figures

VISUAL DISPLAY APPARATUS

DESCRIPTION

This invention relates to visual display apparatus, particularly for ground-based flight simulators and particularly for providing a display covering a wide-angle field of view. The invention may be used in apparatus capable of providing either pseudo-collimated or stereoscopic viewing for a sole pilot or simultaneously for two pilots.

The apparatus is of the head-coupled area-of-interest type, wherein an image is projected upon a screen and is appropriately changed both according to the simulated craft position and angular orientation and according to the viewer's instantaneous line of view and is also moved on the screen to occupy the viewer's field of view.

Apparatus of this type was described in prior U.S. Pat. No. 1,489,758. Such apparatus provided an area-of-interest display for a sole observer which was pseudo-collimated, that is, the same image was projected for left and right eyes, so as to appear at infinity.

A highly retro-reflective screen material, that is one by which incident light is reflected within a very small angle cone with its axis directed towards the incident light source, is necessary to provide high luminosity of the image. This, however, requires that the image is projected along the viewer's line of view. If this requirement is not observed, incident light is reflected to the source and not to the viewer's eyes. The present invention provides a highly retro-reflective screen, by which incident light is reflected within a very small angle cone, but the reflection characteristic is modified in the vertical planes or in other planes of reflection so that the reflected light cone axis is directed downwardly with respect to the line of incident light. This modified characteristic permits of the projection source being offset above the viewer's eye positions. The invention permits of offset in any arbitrary direction, but the following discussion is limited to the case of vertical offset.

Accordingly, the invention provides for projection apparatus in which an image is projected upon a retro-reflective screen along a line which is not coincident with a viewer's line of view, a screen having a retro-reflective characteristic such that the axis of the cone of a reflected beam of light is divergent by a small angle from the line of projection of the light beam, comprising a rear retro-reflective surface of characteristic such that the axis of the cone of a reflected beam of light is colinear with or along the line of projection of the light beam and a forward transparent screen of material having a refractive index other than unity and a grooved front or rear surface.

SHORT DESCRIPTION OF DRAWINGS

In order that the invention may readily be carried into practice, one embodiment will now be described in detail, by way of example, with reference to the accompanying drawings, in which.

DESCRIPTION OF THE EXAMPLE

The apparatus of FIG. 1 will be described first in order to illustrate the form of apparatus in which the present invention may be used with advantage.

Figure 1:
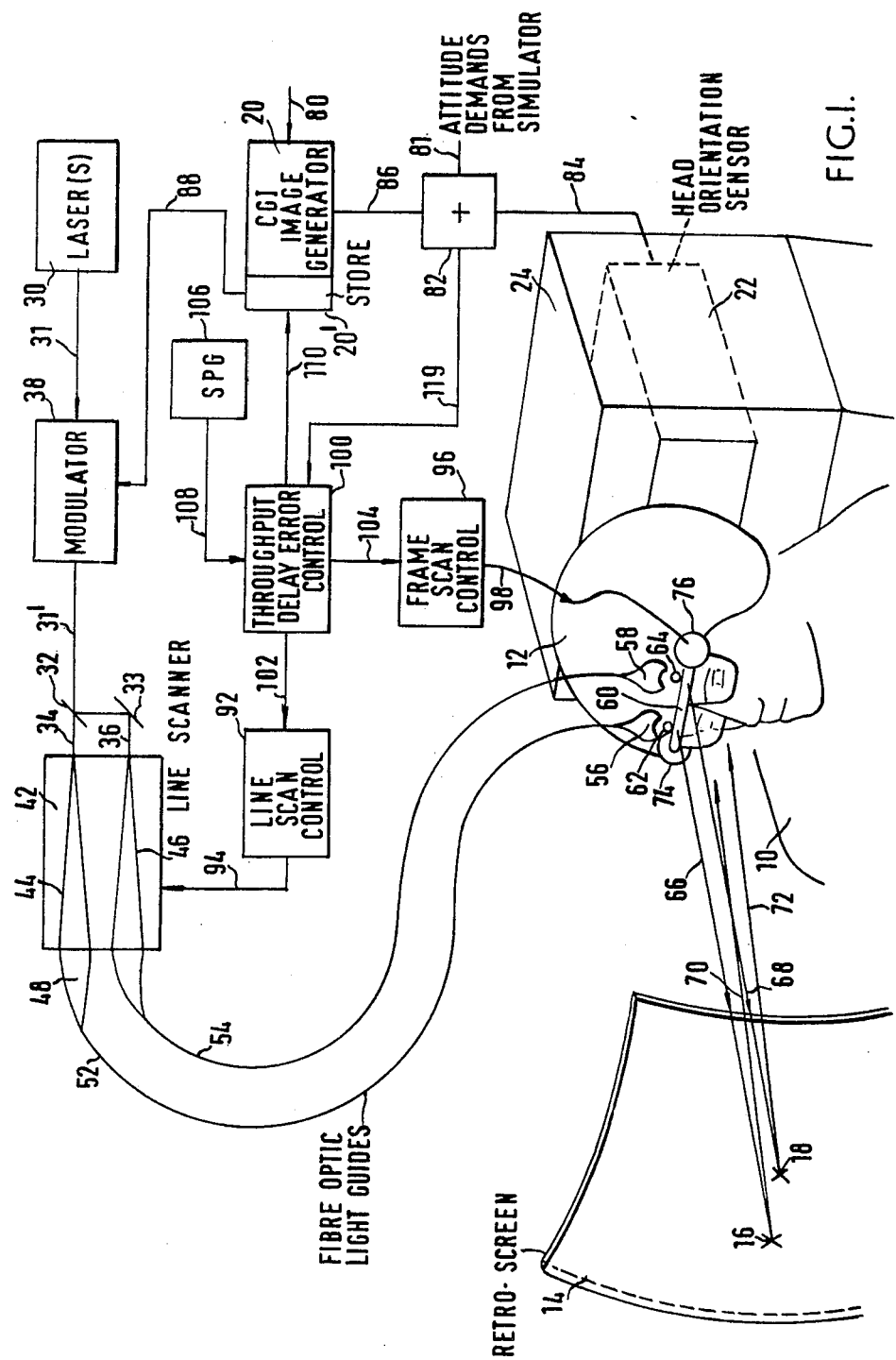
FIG. 1 is a diagrammatic perspective view showing a pilot seated in relation to a part-spherical screen for pseudo-collimated viewing of a head-coupled area-of-interest display.

FIG. 1 shows in diagrammatic form the apparatus according to the invention for generating and displaying a pseudo-collimated area-of-interest view. A pilot 10 wearing a helmet 12 is seated within a part-spherical shell having a retro-reflective inner surface partially represented in FIG. 1 by the concave retro-reflective screen 14. The pilot's line of vision, for right and left eyes and for distant viewing, intersects the screen at points 16 and 18, respectively. The field of view for each eye is centred on the respective one of these two points. The views displayed are identical for right eye and left eye but are displaced laterally by the distance between the points 16 and 18 so that the pilot 10 sees a pseudo-collimated view, that is to say, the displayed view appears to be at infinity and not at the distance of the screen 14. The combined left eye and right eye views will be referred to as the displayed scene.

The displayed scene depends, in this example, upon the simulated position of an aircraft during an exercise flight, the attitude of the aircraft, the pilot's seating position in the aircraft and the pilot's instantaneous line of view as determined by the instantaneous orientation of the pilot's head and helmet. The position of points 16 and 18 on the screen 14 and hence the position of the displayed view on the screen depends only on the pilot's head and helmet orientation.

The image required is generated by an image generator 20 of the computer-generated image type and which includes a frame buffer store 20'. The pilot's head orientation is sensed by a head orientation sensor 22, which is fixedly mounted within the simulated aircraft cockpit in a mounting 24. The displayed view is projected onto the screen 14, centred in the appropriate locations as two raster-scanned images, the line scan apparatus being cockpit-mounted and the frame scan apparatus being mounted on the helmet 12. Line scan may be either across the screen 14 or up or down. In the present example, the projected scan line upon the screen and the line between the pilot's two eyes lie in the same plane. The frame scan is orthogonal thereto. Thus, when the pilot's head is upright line scan is horizontal and frame scan vertical.

Referring still to FIG. 1, a laser source 30 provides an output laser beam 31 which is directed through a full colour modulator 38 to provide a modulated laser beam 31'. The modulated beam 31' is directed through beam-splitter and reflector elements 32, 33 to provide two beams 34 and 36 of equal intensity. The modulator 38 is controlled from the image generator 20 according to the view to be projected. Both modulated beams 34 and 36 pass to a double line scanner 42 fixedly mounted in the simulated aircraft cockpit. The two scanners, described in detail later herein, provide two respective scanned beams 44 and 46 which are respectively scanned over the input ends 48 and 50 of two fibre optic light guide ribbons 52 and 54.

The two fibre optic light guides provide a flexible linkage between the fixed line scanner 42 and the movable helmet 12. The emergent scanned light beams from the respective ends 56 and 58 of the light guides 52 and 54 are focussed by spherical lenses 62 and 64 onto the screen 14 and directed onto a plane mirror 60. The right eye beams are reflected by the mirror 60 along divergent paths to form a scan line the centre of which is shown at 66. Similarly, the left eye beams are reflected by the mirror 60 along divergent paths to form a scan line the centre of which is shown at 68. The centre line of the respective right eye and left eye views is thereby formed on the screen 14, each line having its respective mid point at 16 and 18 and being viewed by the pilot 10 in the respective line of view 70 and 72.

The mirror 60 is long in relation to its width and is carried in bearings at its end which are mounted on the helmet 12. These bearings are provided by motors 74 and 76 at the two ends which move the mirror 60 to provide the required frame scan.

The mirror 60 may be a single plane mirror which is either oscillated or rotated by the motors 74, 76 on its axis parallel to the plane in which the line scan is projected or the mirror 60 may be a multi-faceted polygon mirror rod of, for example, octagonal cross-section which is continuously rotated by the motors 74, 76. In the present example, the mirror 60 is a single plane mirror and is rotationally oscillated for frame scan.

As the pilot's head moves, so does the displayed view move over the screen, so as to be in the pilot's new line of view and the view itself is changed according to the simulated real world view in the direction of the line of view.

To this end, the visual system receives data from the host flight computer on lines 80 and 81. Position data defining the simulated aircraft position throughout a simulated flight exercise is supplied to the image generator 20 on line 80. Attitude data, defining the simulated aircraft instantaneous attitude, is supplied on line 81 to a vector summing unit 82 together with head orientation data, defining the pilot's actual instantaneous line of view, on line 84. The summed output is supplied to the image generator 20 on line 86. A throughput delay error signal obtained by subtracting the head attitude input to the image generator one throughput delay period ago from the current head attitude position, is supplied to the throughput delay error control unit 100 on line 119.

The duplicated image, respectively for the right eye and left eye views, in accordance with the inputted data, and allowing for the known seating position of the pilot in the simulated aircraft type, are supplied to the respective modulators 38 and 40 on lines 88 and 90.

It will be noted that the projection middle lines 66 and 68 do not coincide with the lines of view 70 and 72 for the reason that projection is effected from above the pilot's eyes. Projected onto any horizontal plane, the respective lines are coincident but, projected onto any vertical plane, the respective lines diverge away from the screen. The angle of divergence is small but is nevertheless great enough, compared with the apex angle of the half-brilliance cone of reflection of a retro-reflective screen material to result in a viewed scene of much reduced brilliance. It is preferred therefore to use a screen of modified retro-reflective material for which the axis of the half-brilliance cone of reflection is depressed downwardly by the angle between the projection lines 66, 68 and the line of view lines 70, 72.

Modified Retro-Reflective Screen

Retro-reflective projection screen material such as that sold under the name SCOTCHLITE (Registered Trade Mark) has a reflection characteristic such that what light is reflected by the screen is reflected back closely along the line of incidence. That is to say, reflected light is brightest on the line of incidence, falling in intensity rapidly as the eye is displaced from the line of incidence in any direction. With one sample of retro-reflective material, observed brightness falls to one-half intensity at an angle of 0.8° displacement from the line of incidence. Stated in other words, the area of half-brightness is the base area of a cone that has its axis on the line of incidence and having a half-angle of 0.8° at its apex.

In the projection apparatus described with reference to FIG. 1, the line of incidence 66, between the frame scanner 60 and the screen 14, makes an angle which is also approximately 0.8° with the line of view 70, between the screen 14 and the eye of pilot 10. Thus, with an unmodified retro-reflective screen, the projected image would be seen at half-brightness by the pilot.

Figure 2:
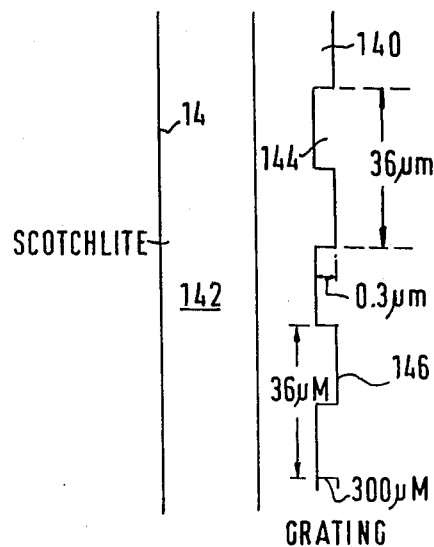
FIG. 2 is a partial, vertical cross-section view showing the construction of a retro-reflective screen and diffraction grating combination having a modified reflection characteristic.

In the apparatus of the invention, it is preferred to modify the reflection characteristic of the screen in order to increase the brightness of the projected image on the pilot's line of view, while decreasing it elsewhere. This modification is effected by placing a diffraction grating in front of the screen surface. FIG. 2 shows an example of one suitable construction.

In FIG. 2, which is a cross-section view in the vertical plane including both the line of incidence 66 and the line of view 70, the surface of the retro-reflective screen is shown at 14. Placed in front of the screen is a diffracting layer 140 of material having a refractive index of 1.5. The layer 140 may be separated from the screen 14 by a layer of air 142. The depth of the layer of air 142 and that of the refracting layer 140 should be kept small to reduce multiple internal reflections.

The front face of the refracting layer 140 is of the form of a diffraction grating of horizontal grooves 144, leaving lands 146 between. In this simple example, the width of the grooves 144 and lands 146 is approximately equal. Calculated for light of 550 nm., and a refractive index of 1.5, the depth of the grooves 144 is 0.3 μm., and the spacing of the grooves is 36 μm., in the vertical direction, as shown in the drawing. In practice, groove profile is selected for maximum light in the desired direction. A material is chosen, the refractive index of which varies with wavelength in such a way as to minimise variation of this direction with colour (wavelength) of the light.

The reflection characteristic of the composite retro-reflective surface and diffraction layer, in the plane of the drawing, is that the light reflection along the line of incidence is reduced, while light reflected at a desired angle to the line of incidence is enhanced. The projected image brightness is thus improved along the line of view, as desired, instead of being concentrated along the line of incidence, as is the case with known reflecting screens.

Figure 3:
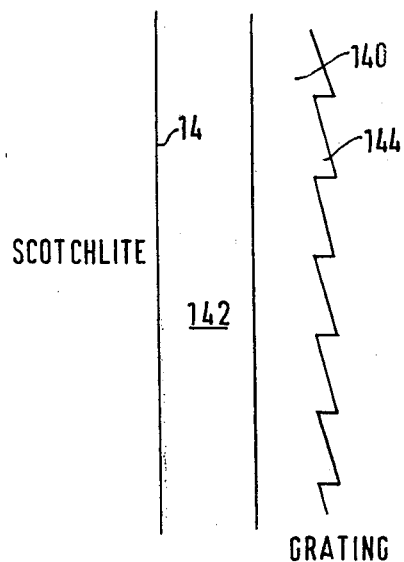
FIG. 3 is a partial, vertical cross-section showing a diffraction grating having a different contour from that in FIG. 2.

FIG. 3 shows in cross-section a composite retro-reflective screen and diffraction grating wherein the cross-section of the diffraction grating is serrated, the grooves of the forward surface running horizontally, which is normal to the plane of the drawing. In this modified form of the diffraction grating of FIG. 2, the angle at the apex of the serrations is simply related to the angle of depression of the emergent light beam. Again, for the example of an angle of 0.8° divergence between the line of incidence and the line of view, the apex angle is 0.4°.

I claim:

1. In projection apparatus in which an image is projected upon a retro-reflective screen along a line which is not coincident with a viewer's line of view, a screen comprising a rear retro-reflective surface of characteristic such that the axis of a reflected beam of light is colinear with or along the line of incidence of an incident light beam and a diffraction grating, positioned adjacent said rear retro-reflective surface, having a refractive index other than unity and a grooved surface whereby said screen is provided with a retro-reflective characteristic such that the axis of a reflected beam of light differs by a small angle from the line of incidence of the incident light beam.

2. A screen as claimed in claim 7, in which the angle between the line of incidence and the line of view is less than one degree.

3. A screen as claimed in claim 2, in which the diffraction grating has a plane rear surface, nearer the retro-reflective screen, and a grooved front surface of rectangular cross-section.

4. A screen as claimed in claim 2, in which the diffraction grating has a plane rear surface, nearer the retro-reflective screen, and a grooved front surface of serrated cross-section.

5. A screen as claimed in claim 3 or claim 4, wherein the line of incidence is above the line of view, the said grooves of the diffraction grating run horizontally and the axis of the cone of a reflected beam of light is deflected downwardly.

* * * * *